United States Patent

Melchior et al.

[15] 3,697,880

[45] Oct. 10, 1972

[54] CIRCUIT FOR SWITCHING BETWEEN TWO UNIDIRECTIONAL VOLTAGES

[72] Inventors: Gerard Melchior, Paris; Dusan Sinobad, Orsay, both of France

[73] Assignee: Compagnie Generale D'Electricite, Paris, France

[22] Filed: Nov. 23, 1970

[21] Appl. No.: 92,115

[30] Foreign Application Priority Data

Nov. 21, 1969 France....................6940153
April 21, 1970 France....................7014467

[52] U.S. Cl. ..........328/123, 178/5.4 PE, 315/13 CG
[51] Int. Cl. ..........H04b 1/04
[58] Field of Search...... 328/123; 313/92 PF; 315/13 CG; 178/5.4 PE; 307/246, 230

[56] References Cited

UNITED STATES PATENTS

| | | | |
|---|---|---|---|
| 3,492,416 | 1/1970 | Weber | 178/5.4 PE |
| 3,396,233 | 8/1968 | Kagan | 178/5.4 PE |
| 3,413,409 | 11/1968 | Giles | 178/5.4 PE |
| 3,522,368 | 7/1970 | Smith | 178/5.4 PE |

*Primary Examiner*—Donald D. Forrer
*Assistant Examiner*—B. P. Davis
*Attorney*—Sughrue, Rothwell, Mion, Zinn & Macpeak

[57] ABSTRACT

An apparatus for switching between high and low dc beam acceleration voltages in a dichromatic cathode-ray tube. The acceleration voltage is applied to the screen of the tube which because it is conductive has a capacitance with respect to ground. The apparatus comprises a switchable voltage generator for switching between the high and low voltages, a charging path for charging the capacitance of the screen of the cathode ray tube, and a discharging path for discharging the capacitance of the screen. The apparatus also includes a control circuit for controlling conduction through said charging and discharging paths. The provision of the charging and discharging paths enables rapid switching of the beam acceleration voltage and thereby the color of the tube with the disadvantages of a voltage generator with a low output impedance.

8 Claims, 3 Drawing Figures

INVENTOR
GÉRARD MELCHIOR
DUSAN SINOBAD

BY Sughrue, Rothwell, Mion, Zinn & Macpeak
ATTORNEYS

CIRCUIT FOR SWITCHING BETWEEN TWO UNIDIRECTIONAL VOLTAGES

BACKGROUND OF THE INVENTION

Field of the Invention

The present invention concerns switching between dc voltages, such as the sudden application of a high potential to a conductor which is at a low potential. The duration of the transition between the high and low potentials is proportional to the capacitance of the conductor, and the output resistance of a switchable generator which supplies the dc voltages when the generator switches it must charge or discharge the capacitance through its output impedance. It is desirable in some situations to make this transition as short as possible. More particularly, the present invention is applicable to the switching of the acceleration voltage for the electron beam of a dichromatic cathode-ray display tube.

Dichromatic cathode-ray tubes comprise a screen provided with two kinds of luminophores, which are disposed in two superimposed layers, such that the layers are successively encountered by the electrons of the beam when they are appropriately accelerated. The first of these two layers supplies, for example, a red luminescence and the second a green luminescence. If the electron beam is accelerated, for example by a voltage of 14 kV, it passes through the first layer, producing only a fairly weak red luminescence. It then strikes the second layer producing a green luminescence. A green spot then appears on the screen. If, on the other hand, the electron beam is accelerated only by a voltage of 6 kV, for example, the electrons stop in the first layer of luminophores, exciting only that layer, and a red spot appears on the screen. It is thus possible, by deflection of the beam and switching of its acceleration voltage, to produce green and red images on the screen. Of course, intermediate colors may be obtained by employing intermediate acceleration voltages.

Unfortunately, the screen, which must be conductive in order to avoid the formation of a space charge from the electron bombardment, has a parasitic capacitance which may be high, for example 200 pf. The acceleration voltage is applied to the screen and the cathode of the electron gun is grounded. The switchable voltage generator which supplies this acceleration voltage generally has a high output impedance. The high output impedance is due to the design of the generator for low power out. Consequently, for each voltage switching operation, the new acceleration voltage is reached only at the end of a transitional period. The duration of the transition period may cause problems. If it is desired that this period be less than 50$\mu$ s, for example, by keeping the output impedance low, it is necessary to design the switchable voltage generator with a power which may reach several hundred watts. This makes the generator heavy, expensive and increases the energy consumption.

SUMMARY OF THE INVENTION

It is the object of the present invention to provide a dc voltage switching circuit with a fast switching time.

It is another object of the present invention to provide a circuit which supplies output signals of an improved form.

It is a further object of the present invention to provide a dichromatic cathode-ray display tube assembly having acceleration voltage switching, wherein the change from one color to the other is rapid.

The present invention relates to a switching circuit in which two different dc potentials can be successively applied to a conductor, which has a capacitance in relation to ground. The circuit comprises a switchable voltage generator, with an appreciable output impedance which is connected to the conductor and adapted to supply the two dc potentials. The circuit is characterized in that it comprises in addition, at least one pulse generator, controlled by the voltage generator, which supplies at each switching operation, a voltage pulse which is at least equal to the difference between the dc potentials and has sufficient energy to charge the capacitance from one of the potentials to the other. The circuit further comprises a charging path and a discharging path connected between the ground and the conductor, comprising a rectifier and a switching source of substantially constant e.m.f. in series. The pulse generator applies the pulse, when switching from the lower potential to the higher, to the charging path in the direction appropriate for charging the conductor. When switching from the higher potential to the lower, the pulse generator applies the pulse to the discharging path in the direction appropriate for discharging the conductor. The paths each comprise a rectifier which is connected in the direction appropriate for conducting the current through the charging path towards the conductor, and through the discharging path towards the ground.

Figure 1:
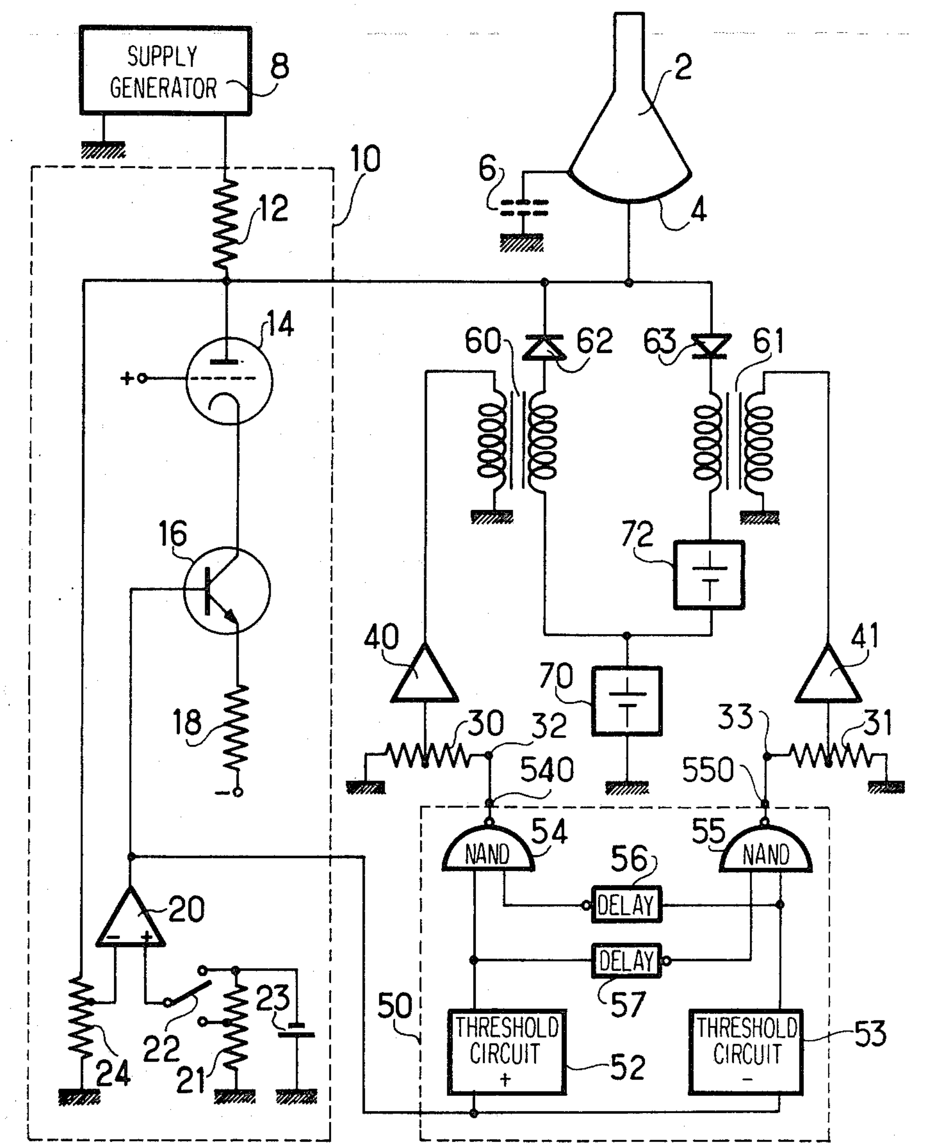
FIG. 1 is a schematic diagram of the circuit of the preferred embodiment of the present invention.

The circuit diagrammatically illustrated in FIG. 1 is the circuit which supplies the acceleration voltage for the electron beam of a dichromatic cathode-ray display tube 2. The cathode of the electron gun (not shown) is grounded. The positive accelerating potential of the beam is applied to the screen 4 of the tube 2. This screen has, relative to ground, a parasitic capacitance 6. The acceleration voltages corresponding to red and to green are of 6 kV. and 14 kV., respectively, it being possible to employ intermediate voltages for obtaining intermediate colors.

The voltage applied to the screen 4 is supplied by a switchable voltage generator. This switchable voltage generator comprises, a supply generator 8 which provides a dc voltage of 21 kV. and a follow-up regulator 10. The regulator comprises a load resistor 12 connected to the supply generator 8 and to screen 4. The current through the resistor 12 is controlled by a series circuit comprising vacuum tube triode 14 and a transistor 16. The grid of the triode 14 is at a fixed potential (+ 24 V) and the cathode of the triode is directly connected to the collector of the transistor 16. The emitter of transistor 16 is connected through a bias resistor 18 to a fixed potential source of minus 24 V.

This series circuit constitutes a known arrangement called a hybrid cascode.

In the hybrid cascode, the plate current of triode 14 is controlled by transistor 16. To effect the control, the base of the transistor 16 is connected to the output of a saturable differential amplifier 20. One input terminal (the positive terminal) of amplifier 20 is at a reference potential which can be changed by means of an electronic switch 22, voltage divider 21 and source 23. The other input of the amplifier 20 is connected to the output terminal of voltage divider 24 which is connected between the ground and the screen 4. The differential amplifier 20 controls, through the transistor 16, the current flowing through the resistor 12 and therefore the potential drop across this resistor, and ultimately the potential applied to the screen 4. The circuit therefore forms a follow-up loop which includes a switchable voltage generator of a type in current use.

The time constant of the acceleration voltage which is controlled by the values of resistor 12 and parasitic capacitance 6. The parasitic capacitance cannot be reduced. With regard to the resistor 12, a reduction in its value would necessitate an increase in the output current of the supply generator 8. This would cause an increase in the dissipated power, and require higher performances for triode 14 and transistor 16. This would result in an increase in weight, cost and power output of the switchable voltage generator 8.

Therefore, in accordance with the present invention a compensating circuit is used which accelerates the charge of the screen 4 when its potential changed from 6 to 14 kV. and accelerates its discharge when its potential is changed from 14 to 6 kV.

The compensating circuit comprises a power stage comprising of two amplifiers 40 and 41. This stage is controlled by the differential amplifier 20 through two adjustable potentiometers 30 and 31 connected to the charge and discharge inputs 32 and 33 respectively. The circuit also includes an inhibiting circuit 50 which will hereinafter be described and which may be considered, for the moment, as simply transmitting the signals which it receives.

The inhibiting circuit 50 and amplifiers 40 and 41 comprise a pulse generator. The charging and discharging outputs 540 and 550 respectively, of circuit 50, are connected to the inputs 32 and 33 respectively.

The amplifier 40 feeds the primary winding of a transformer 60 whose secondary winding is connected between the positive terminal of a switching source 70 and the anode of a rectifier 62. The cathode of rectifier 62 is connected to the screen 4. The negative terminal of the source 70 is grounded. Its electromotive force (e.m.f.) is 6 kV. The positive terminal of source 70 is connected to the negative terminal of another switching source 72 having an e.m.f. of 8 kV. The positive terminal of source 72 is connected through the secondary winding of a transformer 61 to the cathode of a rectifier 63 whose anode is connected to the screen 4. The primary winding of the transformer 61 is fed by the amplifier 41.

These members constitute the two paths of the compensating circuit according to the invention and form a second part of this circuit, the first part consisting of the previously mentioned pulse generator. One of these paths, the charging path, comprises transformer 60, rectifier 62 and source 70. The other, the discharging path, comprises transformer 61, rectifier 63, source 70 and source 72. It will be seen that certain elements are common to both these paths and others are separate, but variations are possible. For example, it would be possible to employ two separate sources such as 70. Or a common transformer could be used provided that the parasitic capacitance of the source 72 is minimized and an amplifier is available which can perform simultaneously the functions of the amplifiers 40 and 41. That is to say, the amplifier can apply to the primary winding alternately positive and negative pulses. The explanation of the operation of the circuit as illustrated in the figure may readily be applied to the different variations.

The operation of the compensating circuit according to the invention will first be described in the case of a change of the potential of the screen 4 from 6 kV. to 14 kV. The secondary winding of the transformer 60 supplies, at the time of switching, a positive pulse 8 kV. This pulse, which is added to the e.m.f. of the source 70, 6 kV., and renders the diode 62 conductive, thereby supplies a charging current to the screen 4.

When the potential of the screen 4 is to be changed from 14 kV. to 6 kV., the secondary winding of the transformer 61 supplies a negative voltage of 8 kV. Since the latter is subtracted from the e.m.f. of the sources 70 and 72 in series, i.e. 14 kV., the diode 63 is rendered conductive. The current corresponding to this pulse then discharges the capacitance 6.

The circuit according to the invention thus makes it possible to apply negative or positive pulses, as required, to a screen whose potential is switched between 6 kV. and 14 kV. Of course, the circuit just described does not prevent the application of intermediate potentials to the screen 4.

Figure 2:
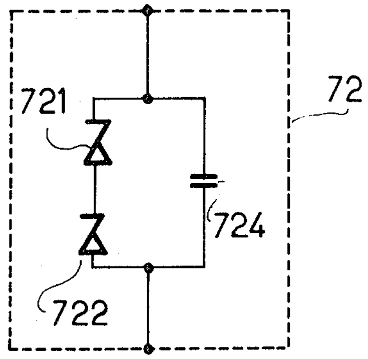
FIG. 2 is a schematic diagram of the preferred embodiment of a voltage source used in the embodiment of FIG. 1.

Referring to FIG. 2, source 72 comprises a series of Zener diodes, of which two, 721 and 722, are shown. The function of these diodes is to limit to 8 kV. the potential difference between the plates of a capacitor 724 whose capacitance is high relative to that of screen 4. The operation of this source is explained by the fact that a successive charging and discharging of the screen 4, currents which flow through the source 72 tending to charge capacitor 724. To maintain its voltage at 8 kV, it is necessary to connect in parallel a voltage-limiting device. Of course, the capacitance of the capacitor 724 must be high in relation to that of the screen 4, so that the internal impedance of the source 72 appears low in relation to the impedance of the screen 4.

Figure 3:
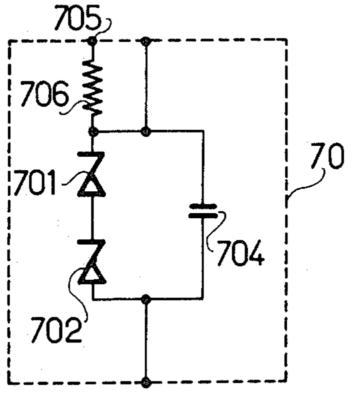
FIG. 3 is a schematic diagram of another voltage source used in the embodiment of FIG. 1.

Referring to FIG. 3, source 70 comprises a series of Zener diodes 701 and 702 which limit to 6 kV. the voltage across the terminals of capacitor 704. This capacitor is charged by the source 8 through a supply terminal 705, across resistor 706. The value of the capacitance of capacitor 704 is high in relation to that of the screen 4, and the value of the resistor 706 is also high so as to minimize the current supplied by the source 8. The value of this current is made as low as possible taking into consideration the characteristics of the Zener diodes such as 701 and 702, so that the latter can correctly perform their voltage-limiting function. The operation of this source is explained by the fact that the average current which it supplies is zero in a succession of chargings and discharges of the screen 4. Of course, the values of the above-indicated voltages are not to be regarded as absolute, since adjustments are obviously necessary as a function of the characteristics of the various components employed.

The operation of the inhibiting circuit 50 (FIG. 1) will now be explained by way of example in the case of a change of the potential of the screen 4 from 6 kV. to 14 kV. The switching process starts with a substantially instantaneous change of the reference potential supplied to the differential amplifier 20 by the switch 22. This amplifier immediately becomes saturated and supplies an output signal having the sign suitable for setting in operation the power amplifier 40, as previously explained (positive signal). The pulse supplied by this amplifier has sufficient energy to effect through the transformer 60, in a time of the order of 20 microseconds, for example, the charging of the parasitic capacitance 6 of the screen 4. However, this transformer has appreciable inductance and this results in an oscillatory process (over oscillation) which tends to cause the potential of the screen 4 to rise temporarily slightly above 14 kV. This could cause the differential amplifier 20 to become saturated in the opposite direction thereby producing a negative signal. This signal would operate power amplifier 41, which would cause the potential of the screen 4 to decrease rapidly. This would rapidly result in another change of state of differential amplifier 20, and would cause the amplifier 40 to operate again raising the potential of the screen 4. This further increase would be slow, because the amplifier 40 is not designed to supply two pulses of equal energy during short intervals of time (for example 10 microseconds). This further increase would take, for example, 150 microseconds, obviating the advantages of the circuit according to the present invention. The function of the inhibiting circuit 50 is to prevent the amplifier 41 from being set in operation by a parasitic over-oscillation immediately after the amplifier 40 operates.

To this end, this circuit comprises two threshold circuits 52 and 53 which receive output signals from the differential amplifier 20. The circuit 52 supplies to a first input of NAND gate 54 a signal of logic 1 when the output signal of the amplifier 20 is positive, and the circuit 53 supplies to a first input of NAND gate 55 a signal of logic 1 when the output signal of amplifier 20 is negative.

A delay circuit 56 receives the signal supplied by the threshold circuit 53, delays it for an appropriate period and transmits it while inverting it to the second input of NAND gate 54, whereby this gate is prevented from rendering the amplifier 40 operative during this period.

Likewise, a delay circuit 57 receives the signal supplied by the threshold circuit 52, delays it for the same appropriate period and transmits it, while inverting it, to the second input of the gate 55, which prevents this gate from rendering the amplifier 41 operative during this period.

It will be seen that this inhibiting circuit has the effect of preventing the operation of the discharging path (gate 55, amplifier 41, transformer 61) for an appropriate period after an operation of the charging path, and vice versa. This period is, for example, 60 microseconds. It is sufficiently short not to reduce the maximum rate of switching of the potential of the screen 4 and sufficiently long to prevent the oscillations which are triggered by the operation of the charging (or discharging) path from causing an untimely operation of the discharging (or charging) path.

While the invention has been particularly shown and described with reference to the preferred embodiment thereof, it will be understood by those skilled in the art that various changes in form and details may be made therein without departing from the spirit and scope of the invention.

We claim:

1. A switching circuit for alternatively applying a higher and a lower DC potential to a conductor, said conductor having a capacitance relative to ground, said circuit comprising:

a. voltage generator means connected to said conductor for supplying said higher and lower DC potentials, said voltage generator means having a high output impedance;

b. at least one pulse generator means controlled by said voltage generator means, for supplying, when said voltage generator means switches from said lower to said higher, or from said higher to said lower DC potential, a voltage pulse equal to at least the difference between said higher and lower DC potentials and having a sufficient energy to charge or discharge said capacitance, respectively, and c. a charging path and a discharging path, each connected between said conductor and ground wherein each of said paths comprises a series circuit including a rectifier, a potential source, and said pulse generator means, said potential sources of said charging and discharging paths having potentials substantially equal to said lower and higher DC potentials, respectively, the said rectifiers of said charging and discharging paths being connected in the sense to, respectively, charge and discharge said capacitance.

2. The circuit of claim 1 wherein said pulse generator means includes a transformer means having primary and secondary winding means wherein said secondary winding means is connected in said series circuits of said charging and discharging paths.

3. The circuit of claim 2 wherein said transformer means comprises two transformers connected in said series circuits such that said charging path includes the secondary winding of one of said transformers and said discharging path includes the secondary wind of the other transformer.

4. A circuit according to claim 3, in which the said potential source of said charging path is a first voltage source being common to said charging and discharging paths, and the potential source of said discharging path is a second voltage source connected only in said discharge path in series with said first voltage source whereby the potential source of said discharging path is the series combination of said first voltage source and said second voltage source.

5. The circuit of claim 4 wherein said second voltage source comprises a voltage limiter and a capacitor connected in parallel, the capacitance of said capacitor being high relative to said capacitance of said conductor.

6. The circuit of claim 4 wherein said first voltage source comprises a voltage limiter and a capacitor connected in parallel, and a resistor in series with said limiter and capacitor wherein the voltage across said first source is higher than the voltage across said limiter and wherein the capacitance of said capacitor is high relative to said capacitance of said conductor.

7. The circuit of claim 1 wherein said pulse generator means comprises:

a. a power stage having a charging input and a discharging input whereby a signal applied to said charging input produces a pulse in said charging path and a signal applied to said discharging input produces a pulse in said discharging path; and
b. inhibitor means, said inhibitor means having a charging output connected to said charging input of said power stage and a discharging output connected to said discharging input of said power stage wherein said inhibitor means produces a signal at said charging output when said voltage generator means switches from a lower to a higher DC potential and a first predetermined time has elapsed since said inhibitor means produced a signal at said discharging output, and said inhibitor means produces a signal at said discharging output when said voltage generator means switches from a higher to a lower DC potential and a second predetermined time has elapsed since said inhibitor means produced a signal at said charging output.

8. The circuit of claim 7 wherein said inhibitor means comprises a. a first threshold means for producing a logic 1 output when said voltage generator means switches from a lower to a higher dc potential;
b. a second threshold means for producing a logic 1 output when said voltage generator means switches from a higher to a lower dc potential;
c. a first delay means connected to the output of said first threshold means, said first delay means having an inverted output;
d. a second delay means connected to the output of said second threshold means, said second delay means having an inverted output;
e. a first NAND gate having a first input connected to the output of said first threshold means and a second input connected to the output of said second delay means wherein the output of said first NAND gate is said charging output of said inhibitor means; and
f. a second NAND gate having a first input connected to said second threshold means and a second input connected to said first delay means wherein the output of said first NAND gate is said discharging output of said inhibitor means.

* * * * *